(12) United States Patent
Hoyer et al.

(10) Patent No.: US 10,870,174 B2
(45) Date of Patent: Dec. 22, 2020

(54) METHOD FOR PRODUCING A PLASTIC-METAL HYBRID COMPONENT

(71) Applicant: inpro Innovationsgesellschaft für fortgeschrittene Produktionssysteme in der Fahrzeugindustrie mbH, Berlin (DE)

(72) Inventors: Olaf Hoyer, Oberkrämer (DE); Matthias Schulenburg, Berlin (DE); Michael Minkow, Berlin (DE); Gerd Eßer, Kleinmachnow (DE)

(73) Assignee: inpro Innovationsgesellschaft für fortgeschrittene Produktionssysteme in der Fahrzeugindustrie mbH, Berlin (DE)

( * ) Notice: Subject to any disclaimer, the term of this patent is extended or adjusted under 35 U.S.C. 154(b) by 254 days.

(21) Appl. No.: 15/757,674

(22) PCT Filed: Dec. 12, 2016

(86) PCT No.: PCT/DE2016/000437
§ 371 (c)(1),
(2) Date: Mar. 6, 2018

(87) PCT Pub. No.: WO2017/101897
PCT Pub. Date: Jun. 22, 2017

(65) Prior Publication Data
US 2019/0022797 A1    Jan. 24, 2019

(30) Foreign Application Priority Data

Dec. 15, 2015   (DE) .................. 10 2015 016 259

(51) Int. Cl.
*B23K 26/00*    (2014.01)
*B23K 26/244*   (2014.01)
(Continued)

(52) U.S. Cl.
CPC .......... *B23K 26/244* (2015.10); *B23K 26/323* (2015.10); *B23K 26/324* (2013.01);
(Continued)

(58) Field of Classification Search
CPC ............ B23K 2103/04; B23K 2103/08; B23K 2103/18; B23K 26/244; B23K 26/323;
(Continued)

(56) References Cited

U.S. PATENT DOCUMENTS 1,960,042 A    5/1934   Andrus
8,383,242 B2   2/2013   Malek et al.
(Continued)

FOREIGN PATENT DOCUMENTS

DE    10357180 A1     6/2005
DE    102006004769 A1   8/2007
(Continued)

OTHER PUBLICATIONS

DE 102006004769, US 2009/0175571.
DE 102008040782, US 2011/0177286.
DE 102008058225, U.S. Pat. No. 8,383,242.

*Primary Examiner* — Sang Y Paik
(74) *Attorney, Agent, or Firm* — Laine IP Oy (57) ABSTRACT

The present invention relates to a method for producing a plastic-metal hybrid component, in which, in order to improve the adhesion of a metal surface, provided with a corrosion protection layer, of a base body made from metal and at least one plastic component, the corrosion protection layer of the metal surface of the base body is provided with a surface structure having undercuts. In order to avoid damage to the corrosion protection layer a filler material that binds well with the corrosion protection layer is applied on the corrosion protection layer in a specific and limited manner, in the form of successive, preferably metal elements (Continued)

having geometrically determined and/or geometrically indeterminate shape, via relative movement with respect to same. The elements of the filler material applied to the corrosion protection layer are each melted, for example by means of a laser, and welded on the corrosion protection layer, producing the surface structure, having the undercuts, of the corrosion protection layer of the metal surface of the base body. In a subsequent direct spraying process, the undercuts of the surface structure are at least partially filled with a thermoplastic plastic component in such a way that the latter engages in the undercuts, forming the plastic-metal hybrid component.

13 Claims, 7 Drawing Sheets

(51) Int. Cl.
| | | |
|---|---|---|
| *B29C 45/14* | (2006.01) | |
| *B23K 26/323* | (2014.01) | |
| *B32B 15/08* | (2006.01) | |
| *C23C 4/02* | (2006.01) | |
| *B32B 15/18* | (2006.01) | |
| *B32B 7/04* | (2019.01) | |
| *B32B 3/30* | (2006.01) | |
| *B32B 3/08* | (2006.01) | |
| *C23C 4/129* | (2016.01) | |
| *B23K 26/324* | (2014.01) | |
| *B29K 705/00* | (2006.01) | |
| *B23K 103/04* | (2006.01) | |
| *B23K 103/08* | (2006.01) | |
| *B23K 103/18* | (2006.01) | |

(52) U.S. Cl.
CPC .......... *B29C 45/14311* (2013.01); *B32B 3/08* (2013.01); *B32B 3/30* (2013.01); *B32B 7/04* (2013.01); *B32B 15/08* (2013.01); *B32B 15/18* (2013.01); *C23C 4/02* (2013.01); *C23C 4/129* (2016.01); *B23K 2103/04* (2018.08); *B23K 2103/08* (2018.08); *B23K 2103/18* (2018.08); *B29K 2705/00* (2013.01); *B32B 2250/02* (2013.01); *B32B 2255/06* (2013.01); *B32B 2255/205* (2013.01); *B32B 2262/103* (2013.01); *B32B 2307/538* (2013.01); *B32B 2307/714* (2013.01); *B32B 2605/08* (2013.01)

(58) Field of Classification Search
CPC ............ B23K 26/324; B29C 45/14311; B29K 2705/00; B32B 15/08; B32B 15/18; B32B 2250/02; B32B 2255/06; B32B 2255/205; B32B 2262/103; B32B 2307/538; B32B 2307/714; B32B 2605/08; B32B 3/08; B32B 3/30; B32B 7/04; C23C 4/02; C23C 4/129
USPC .................... 219/121.6–121.86; 428/615–687
See application file for complete search history.

(56) References Cited

U.S. PATENT DOCUMENTS

| | | | |
|---|---|---|---|
| 2003/0209288 A1 | 11/2003 | Huang | |
| 2003/0222059 A1* | 12/2003 | De Kock | B23K 9/173 |
| | | | 219/121.63 |
| 2009/0175571 A1 | 7/2009 | Boehm et al. | |
| 2009/0252986 A1* | 10/2009 | Owen | C23F 13/14 |
| | | | 428/623 |
| 2011/0177286 A1 | 7/2011 | Maier et al. | |

FOREIGN PATENT DOCUMENTS

| | | |
|---|---|---|
| DE | 102007023418 A1 | 11/2008 |
| DE | 102008040782 A1 | 2/2010 |
| DE | 102008058225 A1 | 7/2010 |
| EP | 0052207 A2 | 5/1982 |
| JP | 2014051041 A | 3/2014 |

* cited by examiner

METHOD FOR PRODUCING A PLASTIC-METAL HYBRID COMPONENT

FIELD

The invention relates to a method for the production of a plastic-metal hybrid component in which, in order to improve the adhesion of a metal surface of a main body formed from metal provided with an anticorrosive layer and at least one plastic component, the anticorrosive layer of the metal surface is provided with a surface texture having undercuts, which are respectively at least partially filled with the at least one plastic component during a direct injection process in a manner such that the latter interengages behind the undercuts of the surface texture of the anticorrosive layer, whereupon the plastic-metal hybrid component is formed.

BACKGROUND

In hybrid design, lightweight components are characterized by the positive lock of a main body which is usually formed from metal and a plastic portion which is inserted into or attached to the main body. Lightweight components of this type are found in a variety of designs; as an example, they are used in vehicle parts such as, for example, components of a passenger vehicle or goods vehicle.

When thermal spray coatings are deposited onto metallic substrates, then, because of the large temperature differences between the sprayed coating layer and the substrate, high mechanical stresses usually arise which have a negative effect on the adhesion of the coating. In conventional thermal spray coating processes such as, for example, plasma spraying, flame spraying, high velocity flame spraying or wire arc spraying, the spray particles are deposited on the cold substrate in the molten state and are quenched at a high rate of cooling. Similarly, the various mechanical and thermal properties of the coating layer and the substrate, in particular under high mechanical or thermal loads, have a negative influence on the adhesion of the layer.

Adhesion to a smooth and untreated substrate surface is generally insufficient. In order to improve the adhesion of thermally sprayed coating layers, it is generally necessary to roughen the substrate surface prior to thermal coating. This increases the contact surface area between the substrate and the coating materials, and also provides a certain amount of mechanical interlocking. Roughening of this type may, for example, be carried out by sandblasting, grinding or precision turning or machining.

In a method which is known from JP 2014-051041 A, in order to improve the adhesion of metal surfaces and at least one plastic component, in a first step of the method, macroscopic and/or microscopic undercut type slits are introduced into the metal surface to roughen it by means of a pulsed laser beam; their concave opening zone in top view as well as their longitudinal section exhibit a repetitive, geometrically precisely defined shape. In this case, the shapes for the opening regions of the slits to be introduced into the metal surface are stated to be consecutively repeating shapes which in top view are in the form of a circle, gingko leaf, boomerang, ellipse, square, polygon or the like, while the longitudinal section of the slits are triangular, rectangular or trapezoidal in shape. In a second step of the method, using a direct insert molding process, the precisely formed slits in the metal surface are partially filled with the at least one plastic component in a manner such that adhesion between the latter and the slits in the metal surface is improved.

Furthermore, DE 10 2007 023 418 B4 describes a process for roughening the surfaces of components, in particular formed from metal, plastic or ceramic, in order to improve the adhesion of thermally sprayed coating layers which are to be applied thermally, in which the surface is roughened with the formation of microscopic undercuts, wherein diagonally inclined shaped pockets are introduced into the surface with an angle of inclination in the range 20° to 80° using pulsed laser beams; the dimensions of the shaped pockets are such that at least one of the edges of the shaped pockets forms an undercut with respect to the metal surface, wherein at least parts of the surface are treated multiple times with pulsed laser beams which have different angles of orientation, angles of inclination and/or laser energies. Having regard to the quality of the coating, it is said to be advantageous for the spray beam to be guided over the surface at the same inclination as the shaped pockets. In this regard, the shaped pockets should be formed with the same orientation and parallel, with only one edge which is undercut with respect to the surface. An appropriate, suitable angle for the spray beam must therefore be defined more accurately as the shaped pockets become deeper. The tolerances in setting the angle are reduced accordingly. An unsuitable choice for the spraying angle can thus lead to incomplete filling of the shaped pockets, which has a negative influence on or reduces the adhesive strength of the sprayed coating layer.

Furthermore, DE 10 2006 004 769 A1 discloses a known method for roughening metal surfaces in order to improve the adhesion of coating layers which are thermally sprayed onto it. In this regard, in a first step of the method, recesses or depressions are introduced into the surface during a treatment which removes or detaches material, so that the protruding metal of the surface forms raised microstructures, in particular projections, ridges, protuberances or bumps, wherein in at least one second step of the method, these microstructures are deformed and/or broken by further working in a manner such that a substantial proportion of the structures form undercuts with respect to the surface.

Furthermore, DE 10 2008 040 782 A1 discloses a method for the production of a composite component, in particular for application in passenger vehicles, comprising at least one first component with a first contact surface and at least one second component with a second contact surface applied to the first contact surface, in which on the first contact surface of the first component, a surface texture is produced by means of a laser in a manner such that its microstructure is overlaid with a nanostructure. After the surface texturing of the first contact surface of the first component, it is interengaged with the second component, which is formed from a plastic material, in particular a thermoplastic material, by at least partially overmoulding the first component with the second component.

Finally, DE 10 2008 058 225 A1 discloses a lightweight component in a hybrid design formed by a main body with a galvanized steel or iron main body which is reinforced with thermoplastic and is capable of withstanding high mechanical loads. The galvanized steel or iron main body undergoes a surface treatment in order to obtain a secure interlocking connection between the main body and thermoplastic. The pre-treatment of the galvanized steel or iron main body may be carried out using a variety of different methods; as an example, a laser treatment of the zinc surface may be carried out using a pulsed Nd:YAG laser beam. In this manner, different structures can be introduced into the zinc surface. Preferred structures are dot, line or cross structures. Spraying the thermoplastic plastic material is then preferably carried out in a single procedure.

In the known previous methods for the production of lightweight components or hybrid components formed from metal and plastic, the surface texturing of the former is carried out by means of a removal method, for example a laser removal process. This has the disadvantage that with sheets or substrates which are protected against corrosion, the protective layer is damaged or destroyed. Furthermore, the cross section of the substrate is reduced in the texturing zone by the laser removal (perforation). A further disadvantage is that the microstructure is altered in the zone influenced by the heat.

SUMMARY OF THE INVENTION

The objective of the present invention is to provide a method of the type mentioned above, by means of which damage to the corrosion protective layer as well as the disadvantages mentioned above are avoided during production of the surface texture of the anticorrosive metal surface of the main body formed from metal which is provided with undercuts.

This objective is achieved in that an additional substance which can readily be joined to and which is electrochemically compatible with the anticorrosive layer of the metal surface of the main body formed from metal is applied, in a specific and limited manner, in the form of successive, preferably metallic elements with a geometrically determined and/or geometrically indeterminate shape, to the anticorrosive layer of the metal surface of the main body formed from metal by movement relative thereto, and the respective metallic elements of the additional substance applied to the anticorrosive layer are melted and welded to the anticorrosive layer.

Preferably, metal wool strip is used as the metallic additional substance which can readily be joined to and which is electrochemically compatible with the anticorrosive layer, for example formed from zinc, of the metal surface of the main body, for example formed from steel, wherein the metal wool strip is consecutively applied to the anticorrosive layer, in sections as interconnected metallic elements with a geometrically determined and/or geometrically indeterminate form of the metal surface and the respective applied metallic elements are melted and welded to the anticorrosive layer by means of a laser or an alternative focussed source of heat.

In addition, a wire which is unrolled from a wire coil may be used as the metallic additional substance which can readily be joined to and which is electrochemically compatible with the anticorrosive layer formed from zinc of the metal surface of the main body formed from steel, which is consecutively formed in sections from the unrolled end of wire into interconnected metallic elements with a geometrically determined and/or geometrically indeterminate form by means of a wire forming machine tool which is positioned above the anticorrosive layer and moved relative thereto, the respective elements being consecutively applied to the anticorrosive layer from the unrolled end of the wire and welded to the anticorrosive layer by means of the laser or the alternative focussed source of heat.

Preferably, the diameter selected for the texturing wire and the wire wool strip is from a few tenths of a millimetre to several millimetres.

Advantageously, particles are used as the metallic elements of the metallic additional substance which can readily be joined to the anticorrosive layer formed from zinc of the metal surface of the main body formed from steel, which are individually and successively applied, with a geometrically determined and/or indeterminate form, to the anticorrosive layer and subsequently respectively melted and welded to the anticorrosive layer by means of the laser or the alternative focussed source of heat.

Preferably, the particles are applied, by means of a hopper-shaped application device filled with metal powder which is positioned above the anticorrosive layer formed from zinc and moved relative thereto, to the anticorrosive layer as the metallic elements of the metallic additional substance which can be readily joined to the anticorrosive layer, with a geometrically determined and/or geometrically indeterminate form and subsequently respectively melted and welded to the anticorrosive layer by means of the laser or the alternative focussed source of heat.

Preferably, similarly the size of the particles is selected so as to be in the range from a few tenths of a millimetre to several millimetres, so that the texturing in the surface of the directly sprayed plastic mass is not visible.

Furthermore, the surface loading with particles is such that accessibility for the plastic melt to the surface of the main body is ensured.

The metallic elements of the metallic additional substance which can readily be joined to the anticorrosive layer formed from zinc of the metal surface of the main body formed from steel may also be unrolled from the coil and separated individually from the wire into a geometrically determined and/or geometrically indeterminate form by means of a wire cutter which is positioned above the anticorrosive layer and which moves relatively thereto and be applied to the anticorrosive layer by falling downwards from the wire cutter consecutively and spaced from one another and respectively melted and welded to the anticorrosive layer by means of the laser or the alternative focussed source of heat.

Preferably, sections of the texturing wire with a diameter selected to be in the range from a few tenths of a millimetre to several millimetres with a diameter/length ratio of <1 are individually separated from the unrolled texturing wire by means of the wire cutter.

In this manner, the method in accordance with the invention has proved to be particularly advantageous in that the surface texture with undercuts is produced on the anticorrosive layer without damaging the latter. Because additional material is applied, the protection of the metal surface against corrosion is maintained. In addition, the substrate cross section is not compromised. Thus, dimensioning of the substrate geometry is substantially facilitated. In addition, the microstructure of the substrate material is not altered during the laser treatment. The method allows specific local texturing as well as tailored metal gradient coating to be carried out. Furthermore, the laminate properties of bonded joints can be optimized.

BRIEF DESCRIPTION OF THE DRAWINGS

The invention will now be described with reference to the figures in the drawings, in which.

EMBODIMENTS

Figure 1:
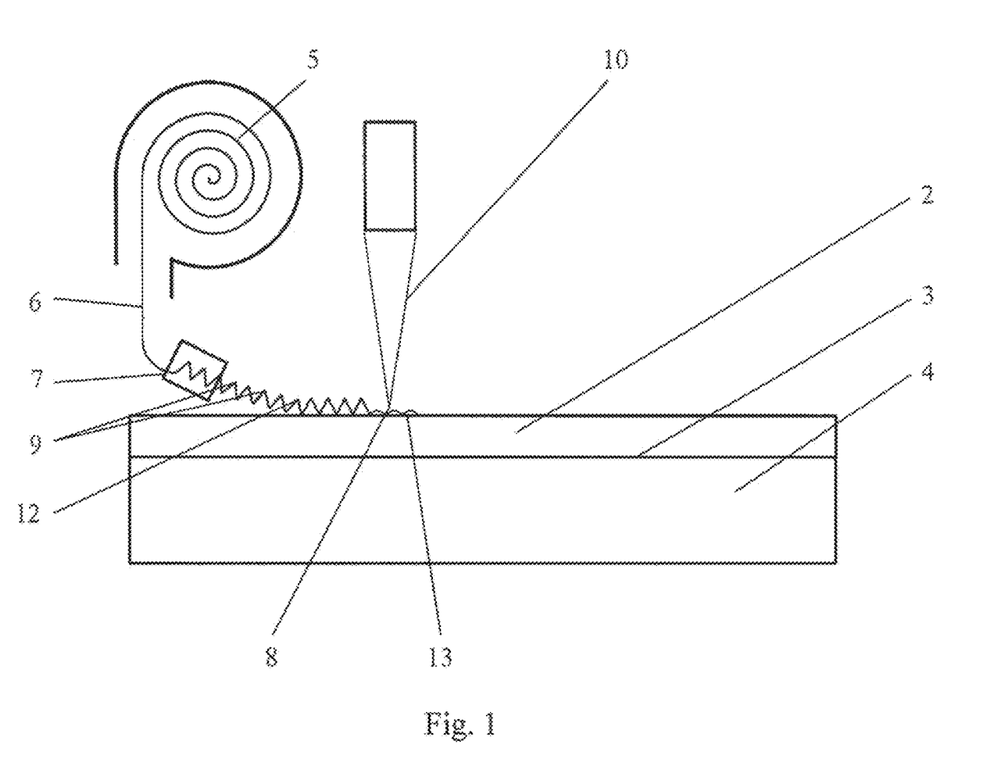
FIG. 1 shows a schematic representation of the production of the anticorrosive layer exhibiting undercuts in the metal surface of the main body formed from steel when using a texturing wire unrolled from a texturing wire coil as the additional substance which can readily be joined to the anticorrosive layer.
Figure 2:
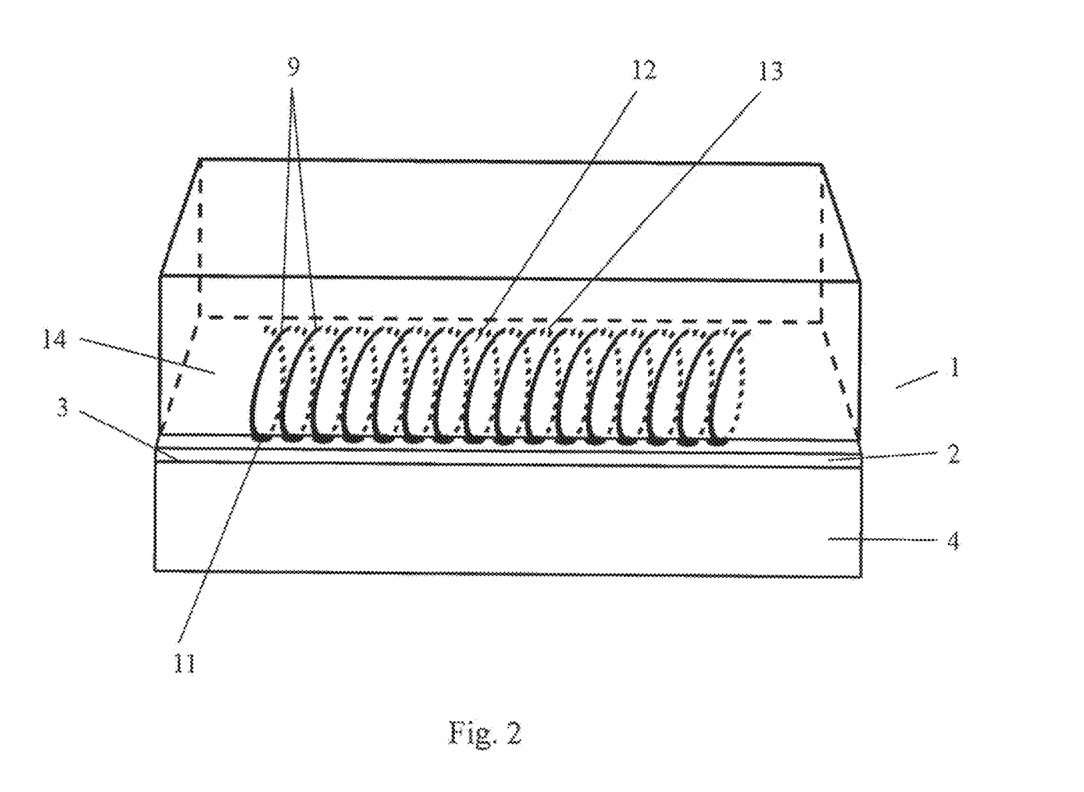
FIG. 2 shows a cutaway representation of the plastic-metal hybrid component produced using the method in accordance with the invention, wherein welding of the texturing wire to the anticorrosive layer is carried out in accordance with FIG. 1.

As can be seen in FIG. 1, in one embodiment of the method for the production of a plastic-metal hybrid component 1, which is shown diagrammatically in FIG. 2 in a cutaway representation, a texturing wire 6 unrolled from a texturing wire coil 5 is used as the additional substance which can readily be joined to an anticorrosive layer 2 formed from zinc of a metal surface 3 of a main body 4 formed from steel. The texturing wire 6 is formed by means of a wire forming machine tool 7, which is positioned above the anticorrosive layer 2 and is moved relative thereto, consecutively in sections from the unrolled end 8 of the texturing wire 6 into interconnected metallic elements 9 with a geometrically determined and/or geometrically indeterminate shape. The interconnected elements 9 of the formed texturing wire 6 in this regard are consecutively applied from the unrolled end 8 of the texturing wire 6 onto the anticorrosive layer 2 and welded to the anticorrosive layer 2 at welding spots 11 by means of a laser 10 or an alternative focussed source of heat, as can be seen in FIG. 2. In this respect, a surface texture 13 having undercuts 12 is produced on the anticorrosive layer 2 of the metallic surface 3 of the main body 4.

As can additionally be seen in FIG. 2, the interconnected elements 9 of the formed texturing wire 6 welded onto the anticorrosive layer 2 at the welding spots 11 by means of the laser 10 are then flooded, in a direct injection molding process, with a melt of a thermoplastic plastic component 14, whereupon the undercuts 12 of the surface texture 13 of the anticorrosive layer 2 are at least partially filled with the plastic component 14 in a manner such that the latter interengages behind the undercuts 12 of the surface texture 13 of the anticorrosive layer 2, whereupon the plastic-metal hybrid component 1 is formed.

Figure 3:
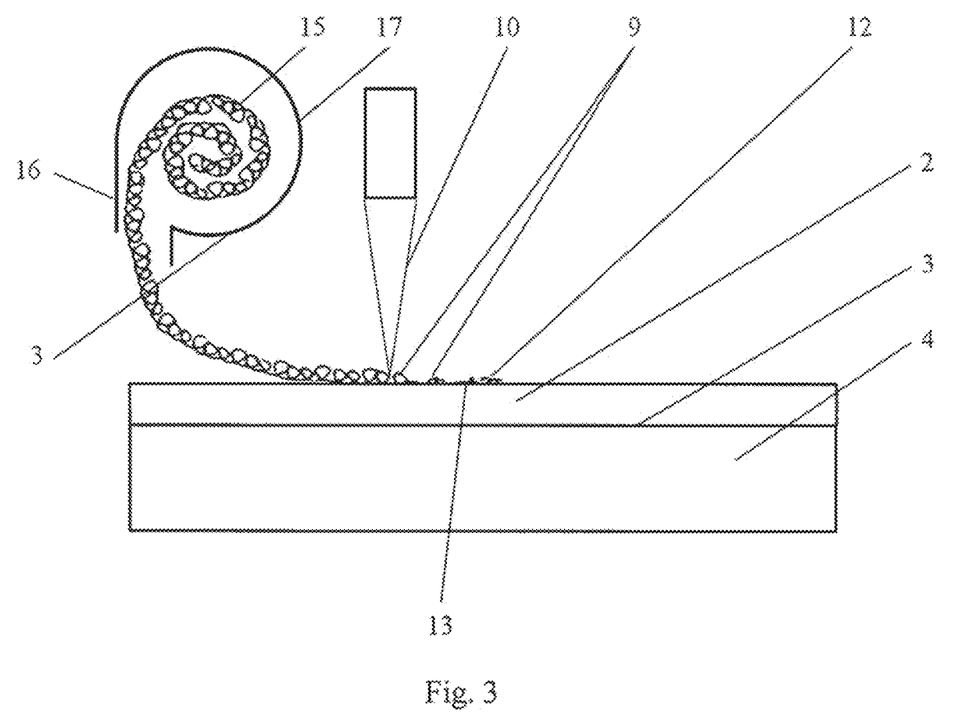
FIG. 3 shows a schematic representation which corresponds to FIG. 1, however it employs a wire wool strip as the additional substance which can readily be joined to the anticorrosive layer.

As can be seen in FIG. 3, in accordance with an alternative embodiment of the method, wire wool strip 15 may also be used as the additional substance which can readily be joined to the anticorrosive layer 2. To this end, the wire wool 15 is deployed as a strip from a duct-like guide 16 of a reservoir 17 filled with the wire wool 15 which is positioned above the anticorrosive layer 2 produced, for example, from zinc, of the metal surface 3 of the main body 4 produced, for example, from steel, and is moved relative to the anticorrosive layer 2 and consecutively applied in the form of sections from the deployed end 18 in the form of interconnected metallic elements 9 with a geometrically determined and/or geometrically indeterminate form, to the anticorrosive layer 2 as the additional substance which can readily be joined thereto. The respective elements 9 of the wire wool strip 15 applied to the anticorrosive layer 2 are then melted by means of the laser 10 or an alternative focussed source of heat and welded to the anticorrosive layer 2, whereupon the surface texture 13 of the anticorrosive layer 2 of the metal surface 3 of the main body 4 provided with undercuts 12 is produced. The plastic-metal hybrid component 1 is subsequently produced by the direct injection process as described above with reference to FIG. 2.

Figure 4:
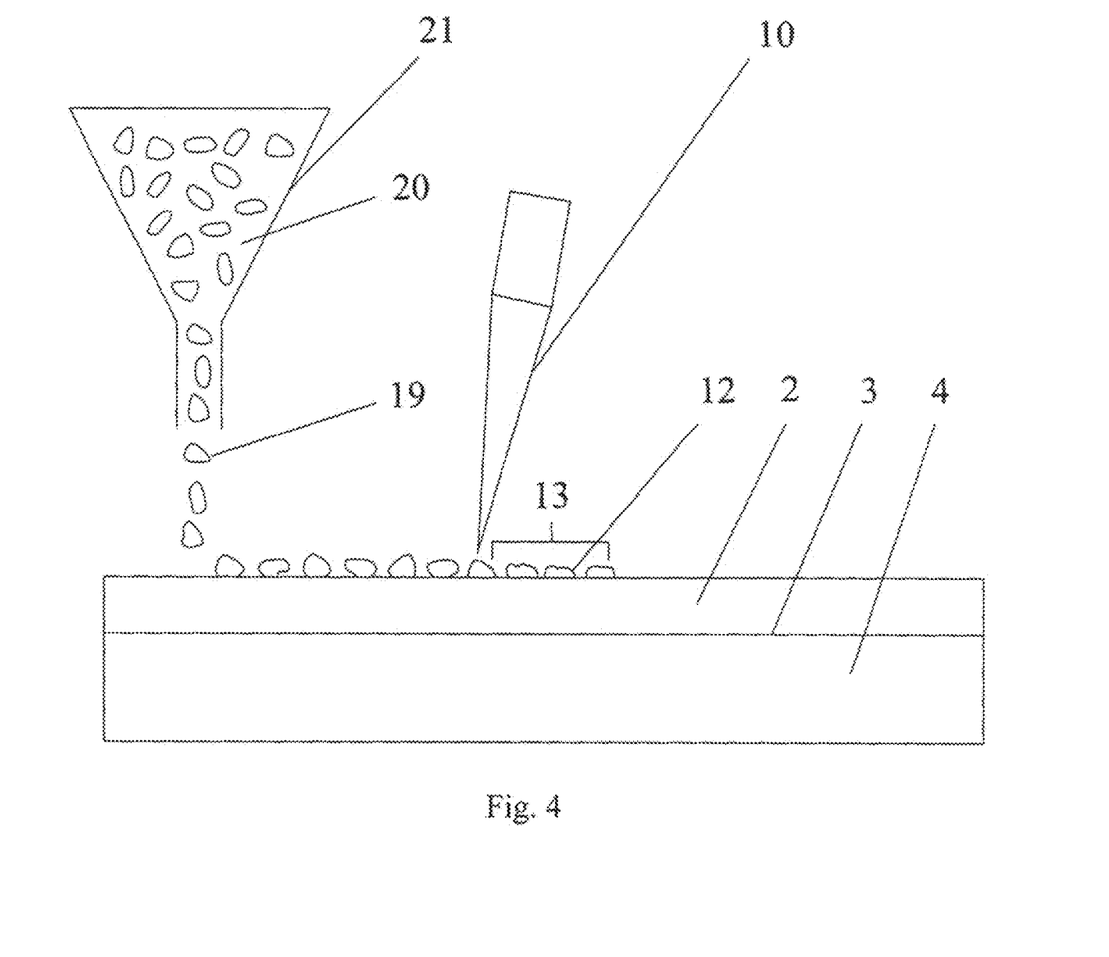
FIG. 4 shows a schematic representation which corresponds to FIG. 1, using particles of a powder as the additional substance which can readily be joined to the anticorrosive layer.

As can be seen in FIG. 4, in a further alternative embodiment of the method, particles 19 may be used as the metallic elements of the additional substance which can readily be joined to the metal surface 3 of the main body 4 formed from steel provided with the anticorrosive layer 2 formed from zinc. In this regard, the particles 19 are applied by means of a hopper-shaped application device 21 filled with powder 20 which is positioned above the anticorrosive layer 2 and moved relative thereto onto the anticorrosive layer 2 of the metal surface 3 of the main body 4 in a geometrically determined and/or geometrically indeterminate form and subsequently respectively melted and welded to the anticorrosive layer 2 by means of the laser 10 or the alternative focussed source of heat. In this regard, the surface texture 13 comprising undercuts 10 of the anticorrosive layer 2 of the metal surface 3 of the main body 4 is produced.

Figure 5:
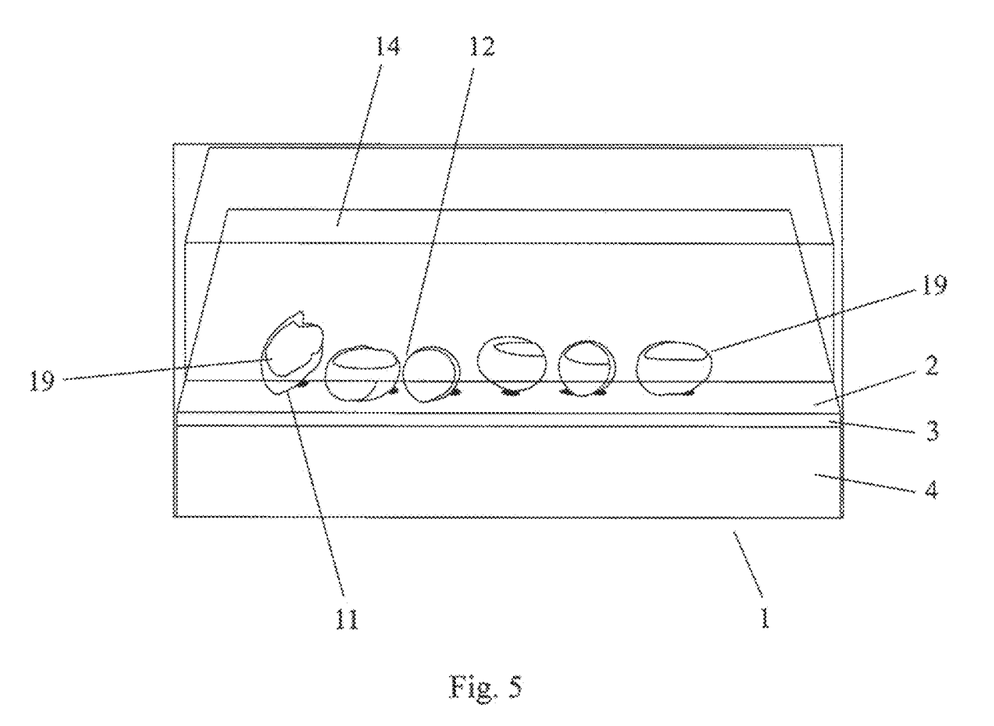
FIG. 5 shows a cutaway representation of the plastic-metal hybrid component produced using the method in accordance with the invention, wherein laser welding or flame spraying of the particles of powder on the anticorrosive layer has been carried out on the powder of FIG. 4.

As illustrated in more detail in FIG. 5, subsequently, using a direct injection process, the respective particles 19 which have been welded to the anticorrosive layer 2 at one of the welding spots 11 are flooded with the melt of the thermoplastic plastic component 14. In this regard, the respective undercuts 12 of the surface texture 13 of the anticorrosive layer 2 are at least partially filled with the plastic component 14 such that it interengages behind the undercuts 12 of the surface texture 13 of the anticorrosive layer 2 of the metal surface 3 of the main body 4 formed from steel, whereupon the plastic-metal hybrid component 1 is produced.

Figure 6:
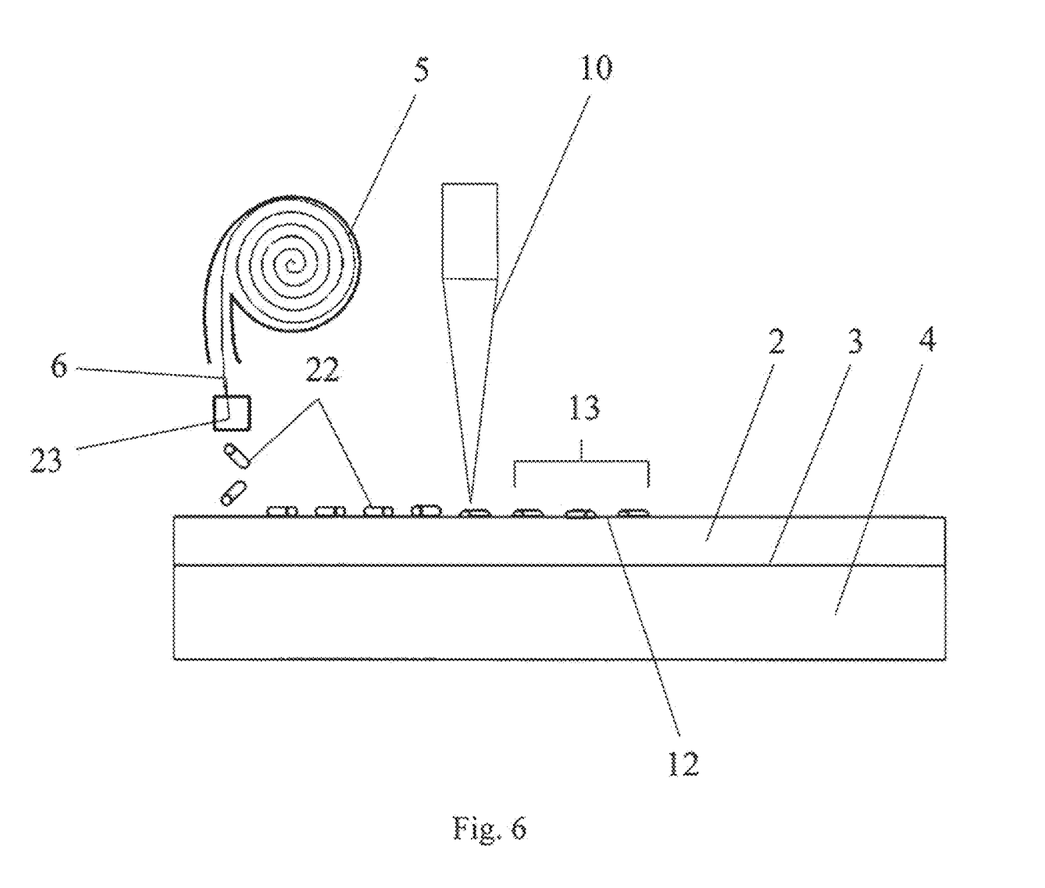
FIG. 6 shows a schematic representation corresponding to FIG. 4, however with the use of separated sections of the texturing wire unrolled from the texturing wire coil as the additional substance which can readily be joined to the anticorrosive layer.

FIG. 6 shows an alternative embodiment of the method of FIG. 4, in which the elements of the additional substance which can readily be joined to the anticorrosive layer 2 formed from zinc of the metal surface 3 of the main body 4 formed from steel are formed by sections 22 of the texturing wire 6 with a geometrically determined and/or geometrically indeterminate form. To this end, the sections 22 of texturing wire 6 unrolled from the texturing wire coil 5 are individually separated by means of a wire cutter 23 which is positioned above the anticorrosive layer 2 and moved relative thereto, into the geometrically determined and/or geometrically indeterminate form, drop consecutively downwards from the wire cutter 23 onto the anticorrosive layer 2 spaced from each other and then, by means of the laser 10 or the alternative focussed source of heat, are respectively melted and welded to the anticorrosive layer 2, whereupon the surface texture 13 of the anticorrosive layer 2 of the metal surface 3 of the main body 4 provided with undercuts 12 is produced.

Figure 7:
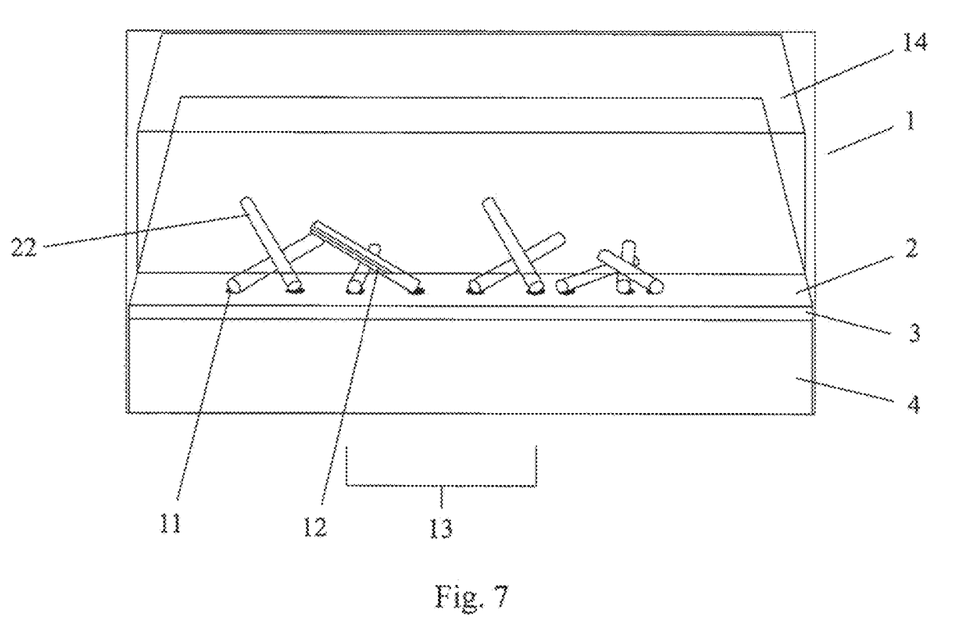
FIG. 7 shows a cutaway representation of the plastic-metal hybrid component produced using the method in accordance with the invention, wherein the laser welding in accordance with FIG. 6 of the sections of the texturing wire which have been separated from the texturing wire using a wire cutter and which have fallen onto the anticorrosive layer has been carried out.

As can be seen in FIG. 7, subsequently, using a direct injection process, the sections 22 of the texturing wire 6 which have been welded to the anticorrosive layer 2 at one of the welding spots 11 of the texturing wire 6 are flooded with the melt of the thermoplastic plastic component 14. In this regard, the respective undercuts 12 of the surface texture 13 of the anticorrosive layer 2 are at least partially filled with the plastic component 14 in a manner such that they interengage into the undercuts 12 of the surface texture 13 of the anticorrosive layer 2 of the metal surface 3 of the main body 4 formed from steel, whereupon the plastic-metal hybrid component 1 is produced.

It should be understood that the embodiments of the present invention are not limited to the specific textures, steps of the method or materials which are disclosed herein, but can be extended to their equivalents, as is known to a person skilled in the art in the relevant fields. It should be understood that the terminology used herein is solely used to describe specific embodiments and should not be construed in a limited fashion. The features, structures or properties described can be combined in any manner in one or more of the embodiments.

LIST OF REFERENCE NUMERALS 1 plastic-metal hybrid component
2 anticorrosive layer
3 metal surface
4 main body
5 texturing wire coil
6 texturing wire
7 wire forming machine tool
8 unrolled end of texturing wire
9 metallic elements
10 laser
11 welding spot
12 undercuts
13 surface texture
14 thermoplastic plastic component
15 wire wool
16 duct-like guide
17 reservoir
18 end of wire coil strip
19 particle
20 powder
21 hopper-shaped application device
22 separated sections of texturing wire
23 wire cutter

The invention claimed is:

1. A method for production of a plastic-metal hybrid component in which, in order to improve the adhesion of a metal surface of a main body formed from metal provided with an anticorrosive layer and at least one plastic component, the anticorrosive layer of the metal surface of the main body is provided with a surface texture having undercuts, which are respectively at least partially filled with the at least one plastic component during a direct injection process in a manner such that the latter interengages behind the undercuts of the surface texture of the anticorrosive layer of the metal surface of the main body, whereupon the plastic-metal hybrid component is formed, wherein an additional substance which can readily be joined to and which is electrochemically compatible with the anticorrosive layer of the metal surface of the main body formed from metal is applied, in a specific and limited manner, in the form of successive elements with at least one of: a geometrically determined shape, or geometrically indeterminate shape, to the anticorrosive layer of the metal surface of the main body by movement relative thereto, and the respective elements of the additional substance applied to the anticorrosive layer are melted and welded to the anticorrosive layer,
wherein a texturing wire which is unrolled from a wire coil is used as the additional substance which can readily be joined to the anticorrosive layer formed from zinc of the metal surface of the main body formed from steel,
which is consecutively formed, in sections from the unrolled end of the texturing wire, into interconnected metallic elements with at least one of: a geometrically determined form or a geometrically indeterminate form, by means of a wire forming machine tool which is positioned above the anticorrosive layer and moved relative thereto, the respective elements being consecutively applied to the anticorrosive layer from the unrolled end of the texturing wire and welded to the anticorrosive layer by means of a laser or an alternative focused source of heat.

2. The method according to claim 1, wherein a metal wool strip is used as the additional substance which can readily be joined to the anticorrosive layer, for example formed from zinc, of the metal surface of the main body, for example formed from steel, wherein the metal wool strip is consecutively applied to the anticorrosive layer, in sections as interconnected metallic elements with at least one of: a geometrically determined form or geometrically indeterminate form, and the respective applied metallic elements are melted and welded to the anticorrosive layer by means of a laser or an alternative focussed source of heat.

3. The method according to claim 2, wherein the diameter selected for the metal wool strip is from a few tenths of a millimetre to several millimetres.

4. The method acquiring to claim 1, wherein the interconnected metallic elements are individually separated from the texturing wire by a wire cutter which is positioned above the anticorrosive layer and which moves relative thereto.

5. The method according to claim 4, wherein the diameter selected for the texturing wire and the wire wool strip is from a few tenths of a millimetre to several millimetres.

6. The method according to claim 1, wherein the elements of the additional substance which can readily be joined to the anticorrosive layer formed from zinc of the metal surface of the main body formed from steel are formed as sections with at least one of: a geometrically determined form or a geometrically indeterminate form of a texturing wire unrolled from a coil which are individually separated from the unrolled end of the texturing wire by means of a wire cutter which is positioned above the anticorrosive layer and which moves relative thereto and which are applied to the anticorrosive layer by falling downwards from the wire cutter consecutively and spaced from each other and respectively melted and welded to the anticorrosive layer by means of the laser or the alternative focussed source of heat.

7. The method according to claim 6, wherein the sections of the texturing wire which have a diameter selected to be in the range from a few tenths of a millimetre to several millimetres with a diameter/length ratio of <1 are individually separated from the unrolled texturing wire by means of the wire cutter.

8. The method according to claim 6, wherein the diameter selected for the texturing wire and the wire wool strip is from a few tenths of a millimetre to several millimetres.

9. The method according to claim 6, wherein the sections of the texturing wire which have a diameter selected to be in the range from a few tenths of a millimetre to several millimetres with a diameter/length ratio of <1 are individually separated from the unrolled texturing wire by means of the wire cutter and the diameter selected for the texturing wire and the wire wool strip is from a few tenths of a millimetre to several millimetres.

10. The method according to claim 1, wherein particles are used as the metallic elements of the additional substance which can readily be joined to the anticorrosive layer formed from zinc of the metal surface of the main body formed from steel, which are individually and successively applied, with at least one of: a geometrically determined form a geometrically indeterminate form, to the anticorrosive layer and subsequently respectively melted and welded to the anticorrosive layer by means of the laser or the alternative focussed source of heat.

11. The method according to claim 10, wherein the particles are applied, by means of a hopper-shaped application device filled with powder, which is positioned above the anticorrosive layer and moved relative thereto, to the anticorrosive layer of the metal surface as the metallic elements with at least one of: a geometrically determined form or geometrically indeterminate form and subsequently respectively melted and welded to the anticorrosive layer by means of the laser or the alternative focussed source of heat.

12. The method according to claim 10, wherein the size of the particles is selected so as to be in the range from a few tenths of a millimetre to several millimetres, so that the texturing in the surface of the directly injected plastic mass is not visible.

13. The method according to claim 10, wherein the particles are applied, by means of a hopper-shaped application device filled with powder, which is positioned above the anticorrosive layer and moved relative thereto, to the anticorrosive layer of the metal surface as the metallic elements with at least one of: geometrically determined form or geometrically indeterminate form and subsequently respectively melted and welded to the anticorrosive layer by means of the laser or the alternative focussed source of heat and the size of the particles is selected so as to be in the range from a few tenths of a millimetre to several millimetres, so that the texturing in the surface of the directly injected plastic mass is not visible.

* * * * *